United States Patent
Ferris et al.

(10) Patent No.: US 10,984,797 B2
(45) Date of Patent: Apr. 20, 2021

(54) COLLABORATION DEVICES

(71) Applicant: Hewlett-Packard Development Company, L.P., Spring, TX (US)

(72) Inventors: Sara Ferris, Houston, TX (US); Dimitre Mehandjiysky, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/650,038

(22) PCT Filed: Dec. 1, 2017

(86) PCT No.: PCT/US2017/064277
§ 371 (c)(1),
(2) Date: Mar. 24, 2020

(87) PCT Pub. No.: WO2019/108231
PCT Pub. Date: Jun. 6, 2019

(65) Prior Publication Data
US 2020/0294500 A1   Sep. 17, 2020

(51) Int. Cl.
*H04N 7/15* (2006.01)
*G10L 15/22* (2006.01)
*G10L 15/26* (2006.01)

(52) U.S. Cl.
CPC ............ *G10L 15/22* (2013.01); *G10L 15/26* (2013.01); *H04N 7/15* (2013.01); *G10L 2015/223* (2013.01)

(58) Field of Classification Search
CPC ............ G10L 15/22; G10L 15/26; H04N 7/15

USPC .............................. 348/14.01–14.16
See application file for complete search history.

(56) References Cited

U.S. PATENT DOCUMENTS

| | | | | |
|---|---|---|---|---|
| 5,808,663 A | * | 9/1998 | Okaya | H04N 7/142 348/14.1 |
| 8,842,152 B2 | | 9/2014 | Couse | |
| 9,239,627 B2 | | 1/2016 | Kryze et al. | |
| 2008/0024388 A1 | | 1/2008 | Bruce | |
| 2009/0003246 A1 | * | 1/2009 | Hung | H04M 1/02 370/260 |
| 2010/0118112 A1 | * | 5/2010 | Nimri | H04N 7/142 348/14.08 |
| 2011/0246172 A1 | * | 10/2011 | Liberman | G06F 40/58 704/2 |
| 2012/0038742 A1 | | 2/2012 | Robinson et al. | |

(Continued)

OTHER PUBLICATIONS

Crestron Mercury Tabletop Conference System—CCS-UC-1, https://www.projectorpeople.com/Crestron-Mercury-Tabletop-Conference-System--CCSUC1/Accessory/41228.

(Continued)

*Primary Examiner* — Melur Ramakrishnaiah
(74) *Attorney, Agent, or Firm* — HP Inc. Patent Department

(57) ABSTRACT

Collaboration devices are disclosed. An example table-top collaboration device, including a housing; a sensor to obtain audio data, image data, or video data; a display including a first portion and a second portion, the first portion viewable from a first side of the device and the second portion viewable from a second side of the device; and a processor to facilitate a collaboration session between participants, the processor to use the audio data, the image data, or the video data during the collaboration session.

15 Claims, 15 Drawing Sheets

(56) References Cited

U.S. PATENT DOCUMENTS

| | | | |
|---|---|---|---|
| 2012/0056973 A1* | 3/2012 | Yano | G03B 21/145 348/14.08 |
| 2014/0298206 A1* | 10/2014 | Kurosawa | G16H 30/20 715/753 |
| 2015/0324002 A1 | 11/2015 | Quiet et al. | |
| 2017/0048486 A1 | 2/2017 | Paripally et al. | |

OTHER PUBLICATIONS

MXT-1000 (10.1" Modero XÂ® Series G4 Tabletop Touch Panel, 2016, http://trade.amx.com/products/mxt-1000.asp.

* cited by examiner

COLLABORATION DEVICES

BACKGROUND

Computers may be used in collaborative work environments during meetings. For example, computers can be used during a meeting for video conferencing in which video and audio data is shared between computers.

Figure 1:
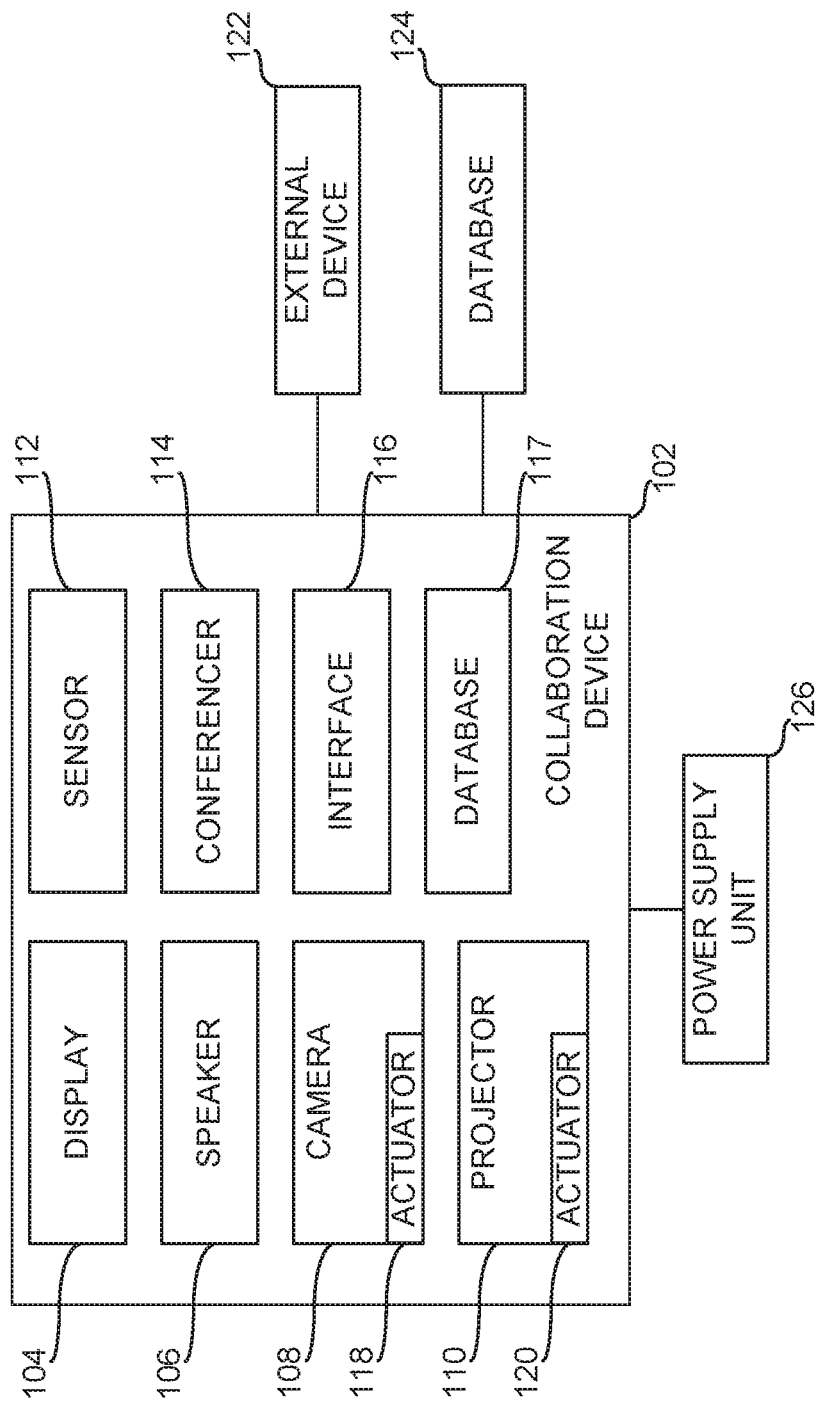
FIG. 1 is a schematic illustration of an example table-top collaboration device in accordance with the teachings of this disclosure.

The figures are not to scale. Wherever possible, the same reference numbers will be used throughout the drawing(s) and accompanying written description to refer to the same or like parts. While the drawings illustrate examples of collaboration devices, other examples may be employed to implement the examples disclosed herein.

DETAILED DESCRIPTION

The examples disclosed herein relate to collaboration devices that facilitate collaboration sessions. In some examples, the collaboration devices are implemented as conference assistant panels having example image, visual and/or audio capabilities to moderate collaboration sessions (e.g., a meeting) and/or otherwise assist participants during collaboration sessions. In some examples, the image, visual and/or audio capabilities enable the collaboration devices to be responsive to commands (e.g., voice commands) and/or provide visual feedback and/or auditory feedback during meetings or otherwise.

The collaboration sessions may include individuals using the example collaboration devices in different locations and/or the same location. In examples in which the collaboration devices are used during a negotiation taking place in a single room, in some examples, a first pair of negotiators may sit across a table from one another using a first collaboration device and a second pair of negotiators may sit across the table from one another using a second collaboration device, where the negotiators sitting on the same side of the table do not share the same collaboration device. In other words, negotiators on a first team (e.g., working for a first company) may use different collaboration devices when conducting negotiations with negotiators from a second team (e.g., working for a second company). Of course, collaboration devices in accordance with the teachings of this disclosure may be used in any suitable way.

The imaging capabilities may include a camera(s). The visual capacities may include a display(s) and/or a projector(s). The audio capabilities may include a speaker(s) and/or an audio sensor(s) (e.g., microphones). In some examples, the displays are implemented as touch screens and/or gesture controlled screens to enable commands to be provided to the collaboration devices. In some examples, the projectors enable images (e.g., documents) to be projected onto a surface such as, for example, a surface in front of the collaboration device. In some examples, the cameras are structured for video conferencing and/or to enable documents to be digitized and thereafter sharable. In some examples, the displays are embedded into the collaboration devices.

In operation and when the collaboration device is implemented as a tabletop device, the example collaboration device may be placed and/or installed on a surface (e.g., a conference table) during a meeting to enable the sharing of data and/or to enable the meeting to be documented. In some examples, the collaboration devices are standalone devices and/or dedicated conference assistant panels. In some examples, the collaboration devices are chained together. Regardless of the configuration of the example collaboration devices, the example collaboration devices enable users to access and/or share data between collaboration devices, with a remote facility (e.g., a remote data storage facility) and/or between an example collaboration device and other devices. In some examples, the other devices include electronic white boards within the conference room. In some examples, the other devices include devices (e.g., laptops, personal computers, etc.) within and/or outside the conference room.

In some examples, the example collaboration devices document the meetings (e.g., a collaboration session) by recording the meeting and/or by processing audio data accessed from the meeting and/or data shared during the meeting. In some examples, processing the audio data includes differentiating between first audio data associated with a first individual speaking (e.g., a first speaker) and second audio data associated with a second individual speaking. In some examples, the processing includes associating the first audio data with the first speaker and associating the second audio data with the second speaker by assigning a first identifier to the first audio data and assigning a second identifier to the second audio data.

In some examples, processing the audio data includes parsing the audio data for keywords and/or commands. In examples in which keywords and/or commands are identified, the example collaboration devices may cause the identified keyword and/or phrase (e.g., a command) to be acted on. Put another way, in some examples, the collaboration devices are responsive to voice commands and/or are voice activated. While the keywords and/or commands may relate to any action, when the keyword and/or phrase relates to generating a calendar event for one of the participants of the meeting, the example collaboration device may generate a calendar event for the identified participant. Other examples of keywords and/or commands that may be identified include saving an audio clip reminder associated with the keyword and/or phrase, creating a reminder for a participant(s) of the meeting, creating an email to be sent to participants of the meeting and/or another individual, creating a summary of the meeting and/or a portion of the meeting, etc. In some examples, the reminder, the email and/or the summary is provided to the participants of the meeting, a participant(s) of the meeting and/or another individual.

As another example, keywords and/or commands may relate to an action that causes a document and/or a page of a document being referred to during a negotiation to be displayed. For example, during a negotiation taking place between negotiators and in response to identifying a keyword and/or command associated with the display of a document, a section of a document, a paragraph number, a paragraph header, a page number, etc., in some examples, the collaboration devices access the data of the corresponding document, the section of the document, the paragraph number, the paragraph header, the page number, etc. and cause the data to be displayed to the negotiators. In this example, the data can be displayed to the negotiators in any suitable way using the example collaboration devices and/or the associated visual capabilities. For example, the collaboration devices can automatically select and/or access the data for display and cause the data to be displayed using the display(s) and/or the projector(s) of the example collaboration devices.

In some examples, processing the audio data includes performing a speech to text conversion of the conversation. In some such examples, the text data can be parsed and/or used to generate notes for the meeting and/or a summary for the meeting. In some examples, processing the audio data includes identifying a language(s) spoken during the meeting and associating the respective portions of the audio data with the different languages by assigning a first identifier to the portion associated with a first language and by assigning a second identifier to the portion associated with a second language.

To enable participants of the meeting speaking in different languages to communicate, in some examples, the example collaboration device communicates to the different speakers in the language that they are speaking. For example, the collaboration devices can display text in a first language (e.g., English) via a first display to a first participant speaking in the first language and can display text in a second language (e.g., Chinese) via a second display to a second participant speaking in the second language. In some examples, the first and second displays are implemented in the same collaboration device that are visible from different sides of the collaboration device. In some examples, the first and second displays are implemented in different devices.

To enable displays of the example collaboration devices to accommodate any number of participants, in some examples, the collaboration devices identify the number of participants in the meeting and designate a portion of the respective displays for each participant or different groups of participants. For example, when two participants are using the collaboration device, a first window may be generated to display data to the first participant and a second window may be generated to display data to the second participant. In examples in which the collaboration devices have a frustum shape, the display may be divided into a first display portion and a second display portion such that first data is displayed to the first participant at the first display portion and second data is displayed to the second participant at the second display portion.

To control access to the example collaboration devices, in some examples, the collaboration devices implement authentication processes to control access (e.g., enable access, deny access) to data stored on the collaboration devices and/or that is otherwise accessible (e.g., data stored on a remote database, network, etc.). In examples in which the authenticating processes includes using biometric data, in some examples, the collaboration devices collect the biometric data from the user via an example camera of the collaboration device and compare the biometric data to reference data for authenticating. In other examples, other authentication processes may be used to enable a user to be authenticated.

FIG. 1 illustrates an example table-top collaboration device 102 that can be used during a collaboration session to exchange messages and/or data (e.g., documents). The messages exchanged may include text-based messages, video messages and/or audio messages. In the illustrated example, the collaboration device 102 includes an example display 104, an example speaker 106, an example camera 108, an example projector 110, an example sensor 112, an example conferencer 114, an example interface 116 and an example database 117.

The display 104 may be implemented by a graphical user interface (GUI), a touch screen and/or a gesture controlled screen. For example, the display 104 may be implemented as an organic light-emitting diode (OLED) display (e.g., a touch high-resolution flex OLED display) or an electronic ink (E-ink) display. In some examples, the display 104 enables data to be displayed and/or commands to be received. In examples in which the collaboration device 102 is implemented as a dedicated collaboration device, in some examples, messages and/or menus can be displayed to users of the collaboration device 102 via the display 104 without otherwise visually disrupting the meeting (e.g., having a prompt be seen on an electronic whiteboard).

In some examples, the display 104 displays data including icons identifying individuals participating in the collaboration session, a live feed of the conversation taking place during the collaboration session and/or an agenda of the collaboration session including the current topic being discussed. However, the display 104 can display any type of data. In some examples, the text of the live feed is separated such that text associated with a contributor (e.g., the person speaking) appears adjacent an icon identifying the contributor (e.g., the individual that spoke the words, an image of the contributor).

In some examples, the data displayed includes a document(s) and/or a graphical control element(s). The graphical control elements may include a first icon associated with a "remember this" command, a second icon associated with a "quick summary" command, a third icon associated with a "flag for comment" command and/or a fourth icon associated with a "reminder" command. While some example commands that are displayable by the display 104 are mentioned, any other commands or icons may be displayed.

The speaker 106 enables the collaboration device 102 to emit audio. For example, the speaker 106 can emit audio corresponding to a meeting taking place. In some examples, the speaker 106 is implemented by two driver speakers and a woofer speaker. The camera 108 facilitates video conferencing and/or enables images to be captured. In some examples, the images captured include an image of a document and/or of the user and/or users of the collaboration device 102. Thus, the example camera 108 enables documents to be scanned and/or obtained in real-time during a collaboration session and/or meeting.

To enable the camera 108 to capture an image of a document, in some examples, an example actuator 118 may direct the camera 108 toward the surface on which the collaboration device 102 is resting to enable an image of the document to be obtained. To enable the camera 108 to capture video and/or image data of the participant in the meeting, in some examples, the actuator 118 may direct the camera 108 toward a face on the individual.

The projector 110 may be implemented by a hand held projector(s) or a pico projector(s). In some examples, the projector 110 enables documents and/or videos to be projected onto a surface adjacent and/or near the collaboration device 102 (e.g., within the same room as). In some examples, the documents and/or videos projected are two and a half dimensional. In some examples, the projector 110 enables a user to interact with the projected image (e.g., a digital document) by signing and/or otherwise editing the document (e.g., active pen, scroll, etc.). To enable the projected image and/or video to be projected onto different surfaces and/or to be orientated differently, in the illustrated example, an actuator 120 is included.

The sensor 112 may be implemented by a motion sensor, a microphone, a proximity sensor, a gestural sensor, a touch sensor, etc. In examples in which the sensor 112 is implemented by a microphone, the sensor 112 enables audio data to be collected. In examples in which the sensor 112 is implemented as a motion sensor and/or a proximity sensor, the sensor 112 can be used to identify an individual joining the meeting (e.g., the individual is moving toward the collaboration device 102) and/or the sensor 112 can be used to identify an individual leaving the meeting (e.g., the individual is moving away from the collaboration device 102). In examples in which the sensor 112 is implemented by a motion sensor and/or a proximity sensor, the sensor 112 can be used to identify a document being moved toward the collaboration device 102 and/or toward the camera 108 for digitizing. In some such examples, when the sensor 112 identifies a document moving toward the collaboration device 102 and/or toward the sensor 112 for digitizing, a trigger may be initiated that causes the camera 108 to obtain an image of the document.

In some examples in which a meeting (e.g., a collaboration session) taking place is between two people using the collaboration device 102 or in examples in which the meeting taking place is between two or more people using the collaboration device 102 and another device, the participants of the meeting may be speaking different languages. In some such examples, to enable the participants to be able to communicate with one another, the example conferencer 114 processes audio data accessed by the sensor 112 and determines the language or languages being spoken.

In examples in which the conferencer 114 determines that two languages are being spoken, in some examples, the conferencer 114 translates the first language to the second language for the second participant speaking the second language and the conferencer 114 translates the second language to the first language for the first participant speaking the first language. In examples in which the conferencer 114 performs a speech to text conversion on the audio data, in some examples, the conferencer 114 causes the display 104 to display the text of the conversation in the corresponding language for the respective participant to receive. For example, when the display 104 includes a first display and a second display on different sides of the collaboration device 102, in some examples, the conferencer 114 causes the first display to display text in a first language (e.g., English) to the first participant speaking the first language and causes the second display to display text in a second language (e.g., Chinese) to a second participant speaking the second language. In other examples, the first and second displays are implemented in different devices.

In some examples, the conferencer 114 generates audio data in the corresponding language being spoken by the different participants and causes the speaker 106 to play the audio for the respective participant to receive. For example, when the first participant is speaking a first language and the second participant is speaking a second language, in some examples, the conferencer 114 translates first audio from the first participant from the first language to the second language for the second participant to hear. Similarly, in some examples, the conferencer 114 translates second audio from the second participant from the second language to the first language for the first participant to hear. In some examples, the conferencer 114 splices the audio from the second participant with the translated audio from the first participant to generate a recording of the conversation in the second language. Similarly, in some example, the conferencer 114 splices the audio from the first participant with the translated audio from the second participant to generate a recording of the conversation in the first language.

In examples in which a single language or two or more languages are being spoken during the meeting, in some examples, the conferencer 114 processes the audio data by performing a speech to text conversion of the conversation. To differentiate between the contributors of the different portions of the conversation, in some examples, the conferencer 114 processes the audio data to identify first audio data from a first participant in the meeting and to identify second audio data from a second participant in the meeting. In some examples, the conferencer 114 adds a first identifier to the first audio data associated with the first participant and adds a second identifier to the second audio data associated with the second participant. In some examples, the conferencer 114 generates display data including the text of the conversation to be displayed by the display 104. In some examples, the display data separates the text of the conversation by contributor and includes identifiers to distinguish between what portion of the conversation was said by what participant.

To identify key words and/or commands said during the meeting, in some examples, the conferencer 114 parses the audio data (e.g., an audio file) and/or the text data (e.g., a text file) for the keywords and/or phrases by comparing the audio data and/or the text data to reference keywords and/or phrases in the database 117. Some keywords and/or phrases associated with identifying participants of the meeting may include "let's take a minute to introduce everyone . . . ," "the meeting participants are . . . ," "Stacy," etc. Some keywords and/or phrases associated with transitioning from one topic to the next may include, "I think we've spent enough time on this topic. Moving onto the next topic, . . . " "And the scheduled topic is . . . ," "Let's now discuss . . . ," etc. Some action item keywords and/or phrases may include "flag that . . . ," "let's revisit that . . . ," "summarize that . . . ," "provide summary of . . . ," "create calendar event for . . . ," "create reminder for . . . ," "generate email to provide meeting summary of . . . ," "save audio clip of . . . ," "provide notes on next topic . . . ," etc.

In examples in which a keyword and/or a command is identified and the keyword and/or phrase includes an action to be performed, in some examples, the conferencer 114 causes the action to be performed. For example, when the command is associated with "prepare a summary," in some examples, the conferencer 114 parses the text of the conversation and generates a summary that is stored in the database 117. Alternatively, in examples in which the command is associated with "generate notes for the second topic of the meeting," the conferencer 114 parses the text of the conversation and generates notes for the second topic of meeting that are stored in the database 117.

To enable the display 104 of the example collaboration device 102 to accommodate any number of participants, in some examples, the conferencer 114 identifies the number of participants using the collaboration device 102 and/or the position of the participants relative to the collaboration device 102 and generates the display data (e.g., the text of the conversation) to enable each participant or each group of participants to have their own portion of the display 104. Put another way, the display 104 may be divided into sub displays or windows such that the number of windows generated to emit tailored data is dynamically adjusted based on the number of participants or groups of participants. In examples in which the display 104 has a circular cross-section and the conferencer 114 determines that two people are participating in the meeting, the conferencer 114 can generate first display data for display at a first portion and/or window of the display 104 and second display data for display at a second portion and/or window of the display 104. Thus, in some such examples, a first participant will be designated the first portion of the display 104 and the second participant will be designated the second portion of the display 104 where the first and second display portions are viewable from different sides of the collaboration device 102 (e.g., opposite sides of the collaboration device 102).

To control access to the example collaboration device 102, in some examples, the conferencer 114 implements authentication processes to control access (e.g., enable access, deny access) to data stored on the collaboration device 102 and/or that is otherwise accessible (e.g., data stored on a remote database, network, etc.). In examples in which the authenticating processes includes using biometric data, in some examples, the collaboration device 102 collects the biometric data from the user via the camera 108 and the conferencer 114 compares the collected data to reference data stored at the collaboration device 102 to authenticate the user. In other examples, other authentication data may be used to enable a user to be authenticated.

To enable the collaboration device 102 to communicate with and/or share data with an example external device 122 and/or to access an example database 124 remote to the collaboration device 102, in the illustrated example, the collaboration device 102 includes the interface 116. In some examples, the interface 116 includes wireless connectivity capabilities to enable the external device 122 placed adjacent or on the collaboration device 102 to connect to the collaboration device 102, to enable content of the external device 122 to be browsed and/or to enable the exchange of data between the collaboration device 102 and the external device 122. In some examples, the interface 116 includes Bluetooth® capabilities and/or near-field communication (NFC) capabilities.

The interface 116 enables the sharing and/or the communication of data between the external device 122 and/or the database 124 in any suitable way including a wireless connection, a wired connection, etc. For example, the interface 116 enables data to be accessible and thereafter viewable at the display 104 of the collaboration device 102. In some examples, the external device 122 is another collaboration device, an electronic white board, a personal computer, a mobile device, etc. In some examples, the database 124 is a cloud-computing environment. In some examples, the interface 116 enables the collaboration device 102 to provide commands to or to otherwise control the external device 122. For example, when the external device 122 is implemented as an electronic whiteboard, the collaboration device 102 can control the data displayed via the electronic whiteboard. To provide power to the example collaboration device 102, in this example, the collaboration device 102 includes an example power supply unit 126. In some examples, the power supply unit 126 includes wireless charging capabilities to enable other devices (e.g., mobile devices) placed adjacent or on the collaboration device 102 to be wirelessly charged.

Figure 2:
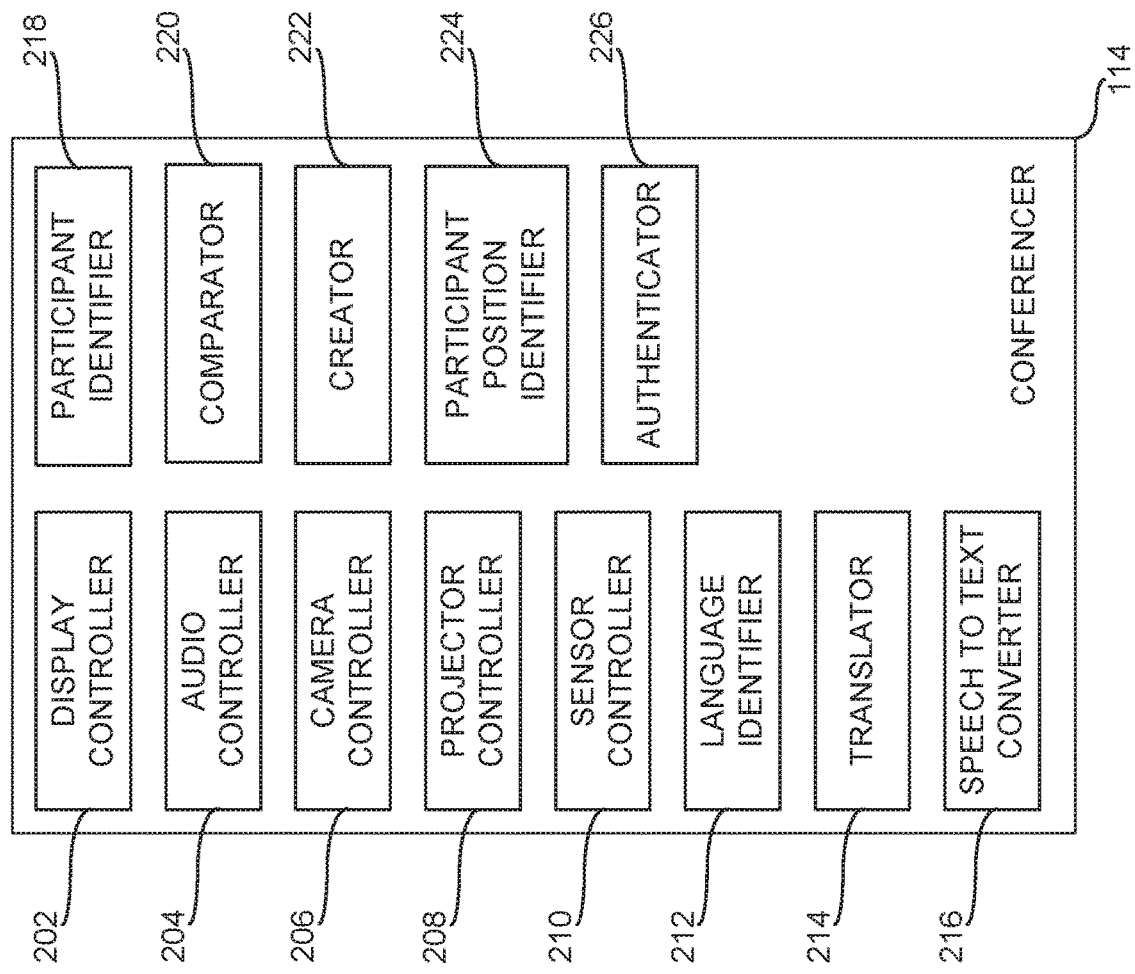
FIG. 2 is a schematic illustration of an example conferencer of the example table-top collaboration device of FIG. 1.

FIG. 2 illustrates an example implementation of the example conferencer 114 of FIG. 1. As shown in the example of FIG. 2, the example conferencer 114 includes an example display controller 202, an example audio controller 204, an example camera controller 206, an example projector controller 208, an example sensor controller 210, an example language identifier 212, an example translator 214, an example speech to text converter 216, an example participant identifier 218, an example comparator 220, an example creator 222, an example participant position identifier 224 and an example authenticator 226.

In some examples, the display controller 202 controls what data is displayed at the display 104 and/or how the data is displayed at the display 104. For example, the display controller 202 generates display data including a first panel identifying meeting topics, a second panel identifying meeting participants and/or participants having questions in queue, a third panel including tabs (e.g., graphical control elements) that enable text of the conversation to be displayed in different ways (e.g., live feed, by person, by topic, etc.), a fourth panel including a graphical control element(s) and a fifth panel including details of the individual logged into the collaboration device 102. In some examples, the display controller 202 causes the first, second, third and/or fourth panels to be displayed at the display 104.

In some examples, the audio controller 204 controls the audio emitted from the speaker 106. In some examples, the camera controller 206 controls the operation of the camera 108 and controls the actuation of the actuator 118 that changes the position of the camera 108 to obtain image and/or video data of the individual using the collaboration device 102 and/or a document presented to the collaboration device 102 for digitizing. In some examples, the projector controller 208 controls what data is displayed by the projector 110 and/or how the data is displayed. In some examples, the projector controller 208 controls the actuation of the actuator 120 that changes where and/or how the image and/or video data is projected via the projector 110 adjacent the collaboration device 102 and/or in a room in which the collaboration device 102 is positioned.

In some examples, the sensor controller 210 controls the sensor 112. For example, when the sensor 112 is implemented as a microphone, the sensor controller 210 causes the sensor 112 to collect audio of the meeting and/or the conference taking place. To determine the language being spoken during the meeting, the language identifier 212 processes the audio data and compares the audio data to reference audio data stored at the database 117 to determine what language or languages are being spoken during the meeting and/or during the conversation.

In some examples, in response to the language identifier 212 identifying a first language being spoken, the display controller 202 causes text to be displayed at the display 104 in a first language and in response to the language identifier 212 identifying a second language being spoken, the display controller 202 causes text to be displayed at the display 104 in a second language. In some examples in which two languages are being spoken in the room in which the collaboration device 102 is located, the display controller 202 causes a first portion (e.g., a first window) of the display 104 to display a first language for the first participant speaking the first language and a second portion (e.g., a second window) of the display 104 to display a second language for the second participant speaking the second language.

In some examples, when the language identifier 212 identifies first and second languages being spoken, the translator 214 translates the conversation such that there is a first transcript of the conversation in the first language and a second transcript of the conversation in the second language. In some examples in which the translator 214 generates first audio data of the first transcript and second audio data of the second transcript, the audio controller 204 causes the first audio data and/or portions of the first audio data (e.g., the portions that the first participant did not say) to be played to the first participant via the speaker 106 and the second audio data and/or portions of the second audio data (e.g., the portions that the second participant did not say) to be played to the second participant via the speaker 106.

To enable participants to hear portions of the conversation not said by themselves and/or portions of the conversation said into a calibration device other than the calibration device being used by the participant, in some examples, the participant identifier 218 processes the audio data and differentiates between first portions of the conversation said by a first participant and second portions of the conversation said by a second participant. To associate the first and second portions with the corresponding first or second participants, in some examples, the participant identifier 218 associates a first identifier with the first portion of the audio data associated with the first participant and associates a second identifier with the second portion of the audio data associated with the second participant.

To identify keywords and/or commands said during the conversation, in some examples, the comparator 220 compares words and/or phrases said during the conversation to reference words and/or phrases stored in the database 117. To identify keywords and/or commands, the comparator 220 may process the audio data collected by the sensor 112 and/or text data generated by the text converter 216. In examples in which a keyword and/or phrase is identified by the comparator 220, in some examples, the creator 222 acts on the keyword and/or phrase to perform the requested action. For example, when the key phrase identified is "create a follow up meeting on Nov. 10, 2017, at 9:00ET," the creator 222 may automatically generate a meeting invite for the participants of the meeting on Nov. 10, 2017, at 9:00ET. In examples in which the creator 222 receives a command to save an audio clip, the creator 222 automatically saves an audio clip at the database 117. While some key phrases that are actionable by the creator 222 are mentioned above in other examples, the creator 222 may perform any other action based on a command received.

To enable the display 104 of the example collaboration device 102 to accommodate any number of participants, in some examples, the participant identifier 218 identifies the number of participants using the collaboration device 102 and the participant position identifier 224 identifies the relative positions of the participants relative to the collaboration device 102 and/or relative to different portions of the display 104. The participant identifier 218 and/or the participant position identifier 224 may identify the number of participants and/or where those participants are positioned by processing audio data, image data and/or video data collected by the camera 108 and/or the sensor 112. Alternatively, the participant identifier 218 and/or the participant position identifier 224 may identify the number of participants and/or where those participants are positioned based on an input received at the interface 116.

When the participant identifier 218 identifies that there are two participants using the collaboration device 102 and the participant position identifier 224 identifies that the first participant is positioned on a first side of the collaboration device 102 and/or the display 104 and the second participant is positioned on a second side of the collaboration device 102 and/or the display 104, the participant position identifier 224 and/or the display controller 202 designates and/or associates a first portion on the first side of the display 104 with the first participant and associates a second portion on the second side of the display 104 with the second participant. Additionally, in some such examples, the participant position identifier 224 and/or the display controller 202 causes data associated with the first participant to be displayed at the first portion of the display 104 and causes data associated with the second participant to be displayed at the second portion of the display 104.

To control access to the example collaboration device 102, in some examples, the authenticator 226 implements authentication processes to control access (e.g., enable access, deny access) to data stored in the database 117 and/or that is otherwise accessible (e.g., data stored at the external device 122, a remote database, network, etc.) by the collaboration device 102. In examples in which the authenticating processes includes using biometric data, in some examples, the authenticator 226 accesses image data from the camera 108 and/or the database 117 and compares the collected data to reference data from the database 117 to authenticate the user. In other examples, other authentication processes may be used to enable a user to be authenticated.

While an example manner of implementing the conferencer 114 of FIG. 1 is illustrated in FIG. 2, the element(s), processe(s) and/or device(s) illustrated in FIG. 2 may be combined, divided, re-arranged, omitted, eliminated and/or implemented in any other way. Further, the example display controller 202, the example audio controller 204, the example camera controller 206, the example projector controller 208, the example sensor controller 210, the example language identifier 212, the example translator 214, the example speech to text converter 216, the example participant identifier 218, the example comparator 220, the example creator 222, the example participant position identifier 224, the example authenticator 226 and/or, more generally, the example conferencer 114 of FIG. 2 may be implemented by hardware, software, firmware and/or any combination of hardware, software and/or firmware. Thus, for example, any of the example display controller 202, the example audio controller 204, the example camera controller 206, the example projector controller 208, the example sensor controller 210, the example language identifier 212, the example translator 214, the example speech to text converter 216, the example participant identifier 218, the example comparator 220, the example creator 222, the example participant position identifier 224, the example authenticator 226 and/or, more generally, the example conferencer 114 of FIG. 2 could be implemented by analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example display controller 202, the example audio controller 204, the example camera controller 206, the example projector controller 208, the example sensor controller 210, the example language identifier 212, the example translator 214, the example speech to text converter 216, the example participant identifier 218, the example comparator 220, the example creator 222, the example participant position identifier 224, the example authenticator 226 and/or, more generally, the example conferencer 114 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example conferencer 114 of FIG. 1 may include element(s), process(es) and/or device(s) in addition to, or instead of, those illustrated in FIG. 2, and/or may include more than one of any or all of the illustrated elements, processes and devices.

Figure 3:
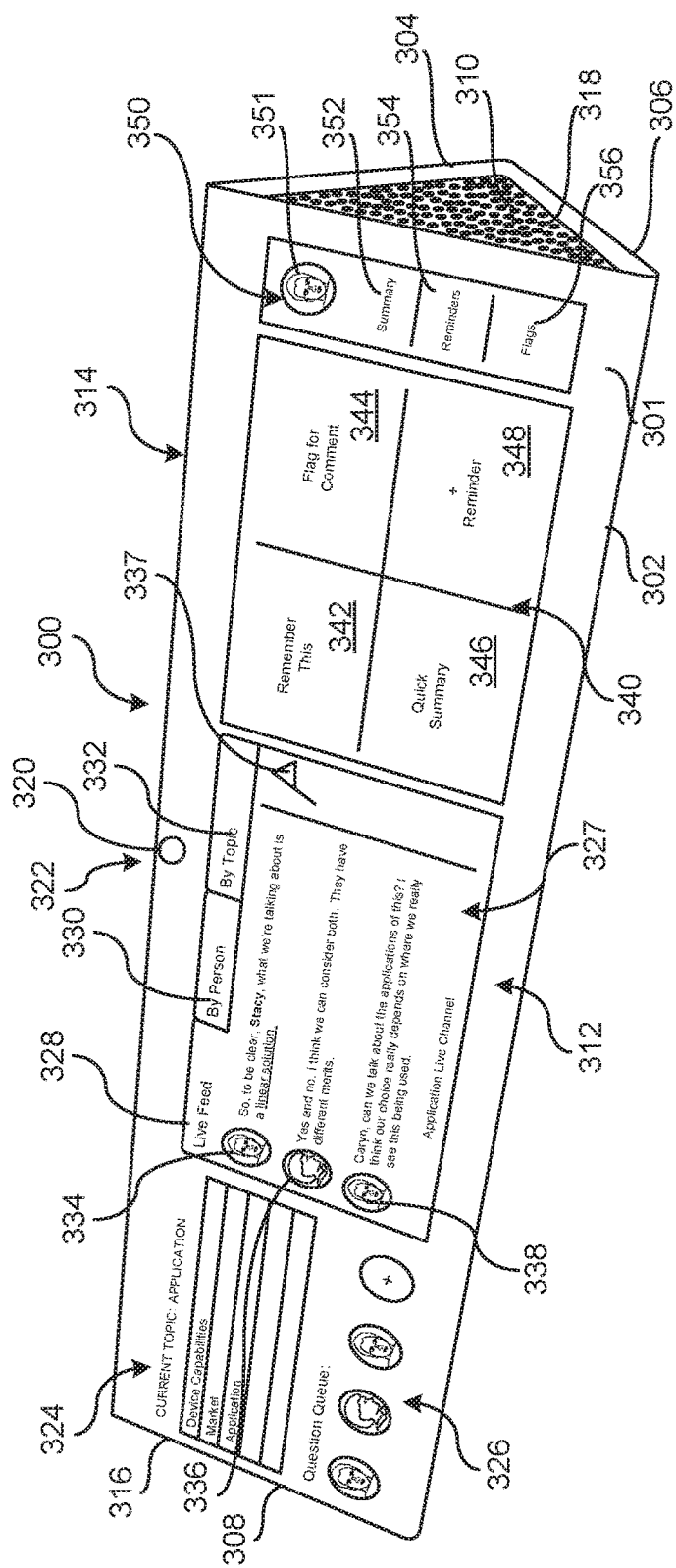
FIGS. 3 and 4 illustrate different views of an example table-top collaboration device that can be used to implement the table-top collaboration device of FIG. 1.
Figure 4:
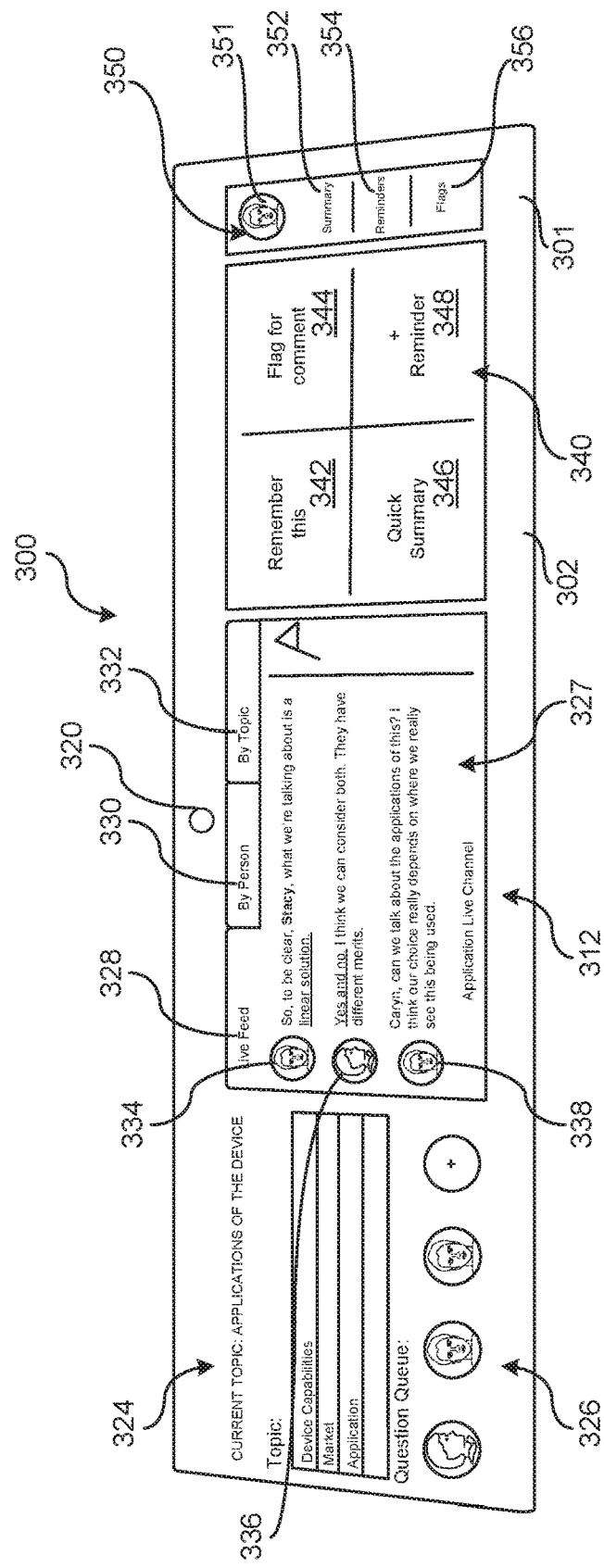

FIGS. 3 and 4 illustrate an example collaboration device 300 that can be used to implement the example collaboration device 102 of FIG. 1. Referring to both FIGS. 3 and 4, the collaboration device 300 has an elongate body and/or housing 301 and a triangular cross section including a first surface 302, a second surface 304, a third surface 306 and first and second ends 308, 310. In this example, the third surface 306 forms a base of the collaboration device 300 and a vertex and/or coupling between the first and second surfaces 302, 304 forms an end of the collaboration device 300 that is smaller and/or narrower (e.g., here implemented as an edge and/or a rounded end) than the third surface 306. In the illustrated example, the first surface 302 includes a first display 312 and the second surface 304 includes a second display 314 that is the same or similar to the first display 312. The first and/or second displays 312, 314 can be used to implement the display 104 of FIG. 1. The collaboration device 300 may be made in any color and/or have any surface texturing. For example, the first, second and/or third surfaces 302, 304, 306 may be black, white and/or wood grain.

To enable audio to be emitted from the example collaboration device 300, in some examples, a first speaker 316 is disposed adjacent the first end 308 of the collaboration device 300 and a second speaker 318 is disposed adjacent the second end 310 of the collaboration device 300. In some examples, the second speaker 318 is the same or similar to the first speaker 316. The first and/or second speakers 316, 318 can be used to implement the speaker 106 of FIG. 1.

To enable image and/or video data to be obtained by the collaboration device 300, in some examples, a first camera 320 is carried on the first surface 302 of the collaboration device 300 and a second camera 322 is carried on the second surface 304 of the collaboration device 300. In some examples, the second camera 322 is the same or similar to the first camera 320. The first and/or second cameras 320, 322 can be used to implement the example camera 108 of FIG. 1.

In the illustrated example, the first display 312 includes an example first panel 324 identifying meeting topics and an example second panel 326 including a questions queue that identifies participants of the meeting that would like to a pose a question. Additionally, in the illustrated example, the first display 312 includes a third panel 327 including a first tab 328, a second tab 330 and a third tab 332. In this example, the first tab 328 is associated with "live feed," the second tab 330 is associated with "by person" and the third tab 332 is associated with "by topic." In some examples, selecting the first tab 328 enables a live feed of the conversation taking place during the meeting to be displayed and separated by participant, selecting the second tab 330 enables the conversation to be filtered and/or parsed by person and selecting the third tab 332 enables the conversation to be filtered and/or parsed by topic. As shown in FIG. 3, the first tab 228 has been selected and the live feed of the conversation is shown including a first participant and corresponding text 334, a second participant and corresponding text 336, a third participant and corresponding text 338 and an example flag 337 is shown adjacent the first participant and first corresponding text 334. In some examples, the flag 337 is added in response to a command received from a recipient regarding flagging the first participant and the corresponding text 334 for comment.

In the illustrated example, the first display 312 includes an example fourth panel 340 including a first graphical control element 342, a second graphical control element 344, a third graphical control element 346 and a fourth graphical control element 348. In this example, the first graphical control element 342 is associated with a "remember this" action, the second graphical control element 344 is associated with a "flag for comment" action, the third graphical control element 346 is associated with a "quick summary" action and the fourth graphical control element 348 is associated with a "reminder" action. If a user selects the first, second, third and/or fourth graphical control elements 342, 344, 346, 348, in some examples, the conferencer 114 and/or the creator 222 perform the requested action.

In the illustrated example, the first display 312 includes a fifth panel 350 including an image 351 of the third participant, a summary icon 352, a reminders icon 354 and a flags icon 356. In some examples, the icons 352, 354, 356 are graphical control elements that are selectable to enable data associated with the selection of the first graphical control element 342 (e.g., "remember this" action), the second graphical control element 344 (e.g., "flag for comment" action), the third graphical control element 346 (e.g., "quick summary" action) and/or the fourth graphical control element 348 ("reminder" action) to be displayed.

Figure 5:
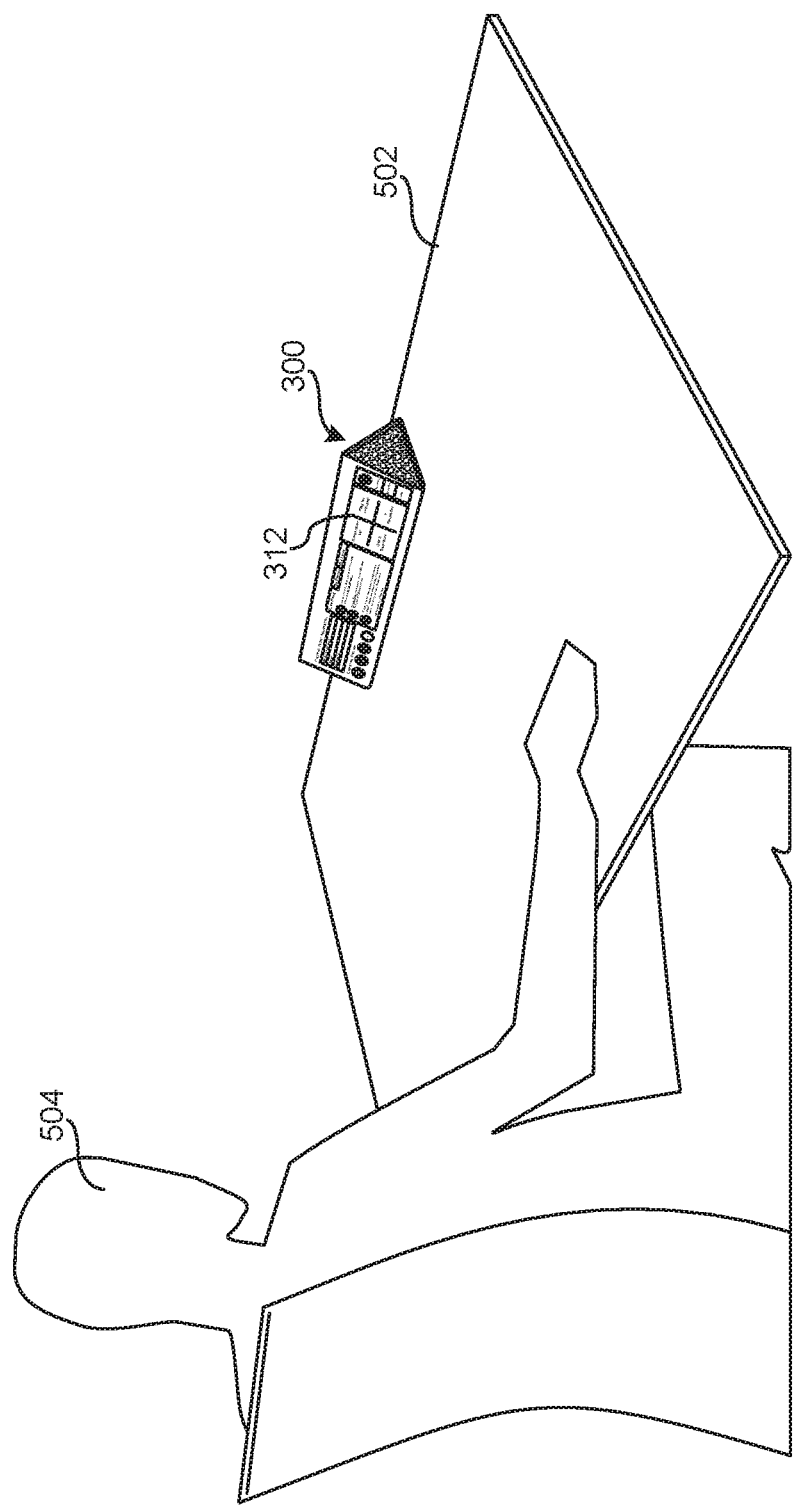
FIG. 5 illustrates the example table-top collaboration device of FIG. 3 being used by an individual.
Figure 6:
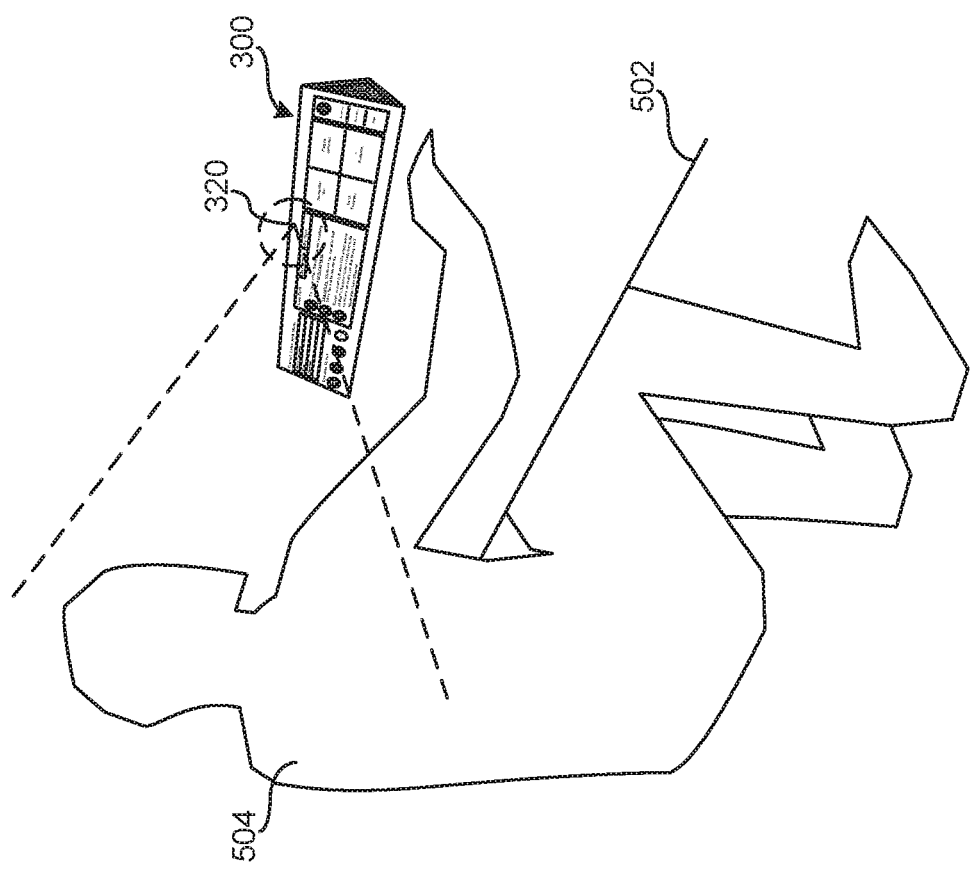
FIG. 6 illustrates an example camera of the example table-top collaboration device of FIG. 3 in an example video-conferencing mode.
Figure 7:
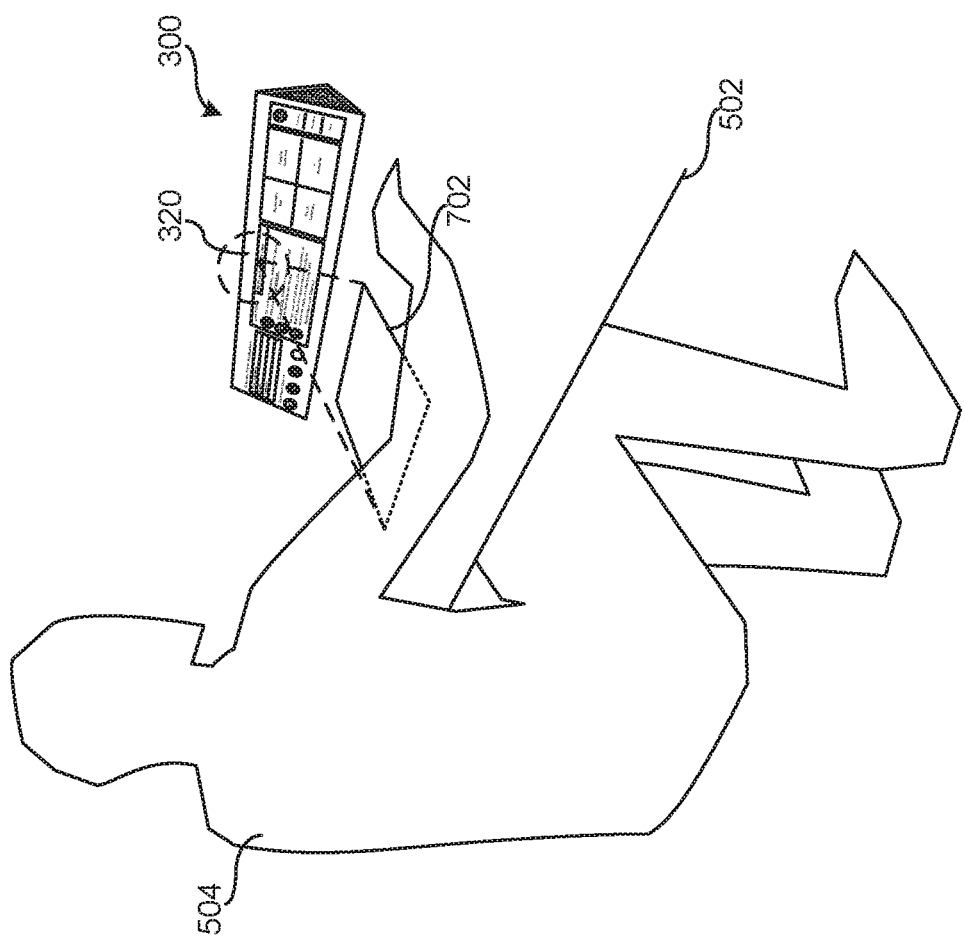
FIG. 7 illustrates the example camera of the example table-top collaboration device of FIG. 3 in an example document-digitizing mode.

FIG. 5 illustrates the example collaboration device 300 disposed on a table 502 such that the first display 312 is facing an individual 504 using the example collaboration device 300. FIG. 6 illustrates the first camera 320 facing the individual 504 to enable image and/or video data of the individual 504 to be obtained. Thus, FIG. 6 illustrates the first camera 320 in a video conferencing mode. FIG. 7 illustrates the first camera 320 facing a document 702 to enable an image of the document 702 to be obtained for digitizing. Thus, FIG. 7 illustrates the first camera 320 in a document-digitizing mode.

Figure 8:
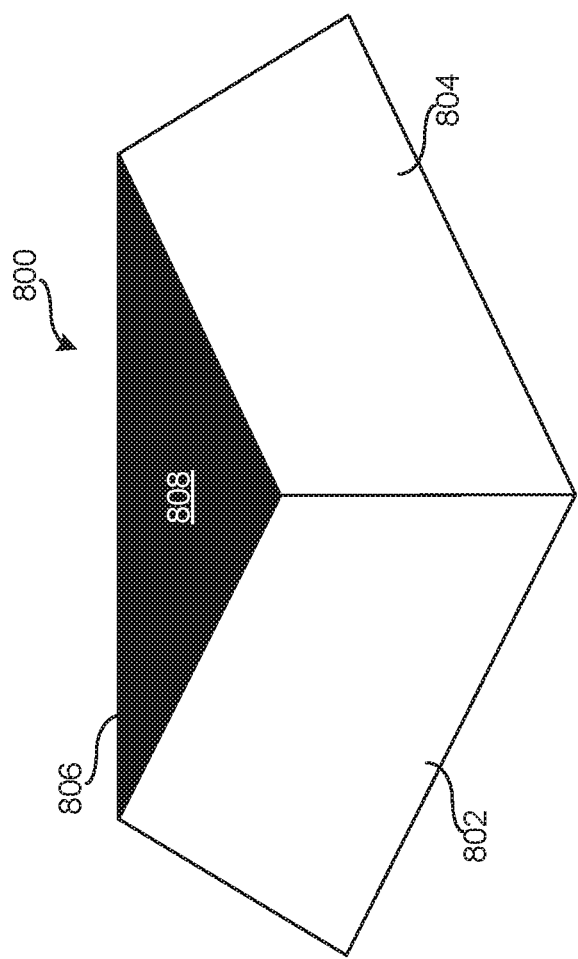
FIG. 8 illustrates an example table-top collaboration device having a triangular frustum shape that can be used to implement the example table-top collaboration device of FIG. 1.

FIGS. 8-12 illustrate different example table-top collaboration devices 800, 900, 1000, 1100, 1200 having different form factors that can be used to implement the example collaboration device 102 of FIG. 1. The example collaboration device 800 of FIG. 8 is a triangular frustum including a first side 802, a second side 804, a third side 806 and an end 808. In some examples, the first, second and third sides 802, 804, 806 are used to implement the example display 104 of FIG. 1 such that the first side 802 carries a first display, the second side 804 carries a second display and the third side 806 carries a third display. Thus, in some such examples, the first side 802 is used to display data to the first participant, the second side 804 is used to display data to the second participant and the third side 806 is used to display data to the third participant. In some examples, the end 808 implements the speaker 106 of FIG. 1.

Figure 9:
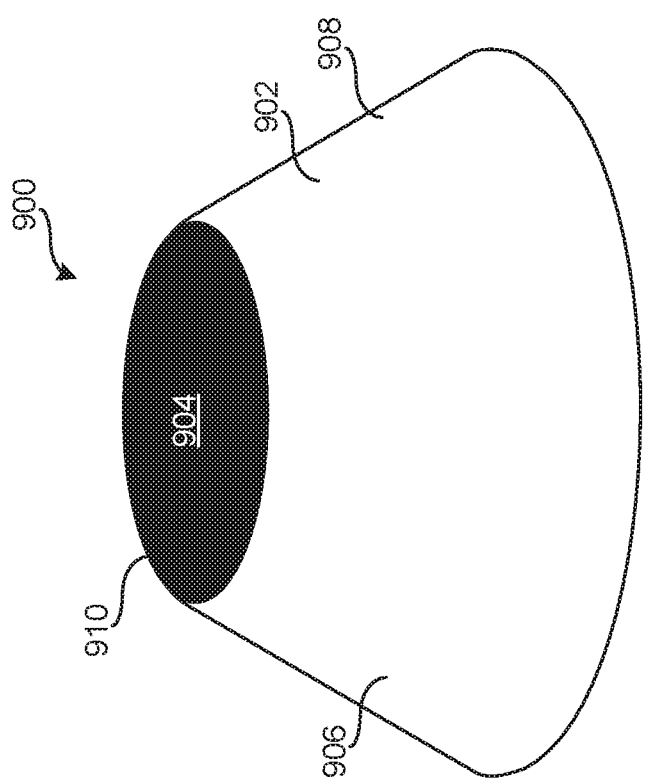
FIG. 9 illustrates an example table-top collaboration device having a conical frustum shape that can be used to implement the example table-top collaboration device of FIG. 1.

The example collaboration device 900 of FIG. 9 is a conical frustum including a conical surface 902 and an end 904. In some examples, the conical surface 902 implements the example display 104 of FIG. 1 and the end 904 implements the speaker 106 of FIG. 1. To provide different participants a portion of the conical surface 902 to display corresponding data and/or to enable the participants to interact with the collaboration device 900, in some examples, the participant identifier 218 identifies the number of individuals using the collaboration device 900 and the participant position identifier 224 identifies the first participant being positioned on a first side 906 of the collaboration device 900 and the second participant being positioned on a second side 908 of the collaboration device 900. In some such examples, the participant position identifier 224 and/or the display controller 202 designates and/or associates the first side 906 of the conical surface 902 with the first participant and associates the second side 908 of the conical surface 902 with the second participant. Additionally, in some such examples, the participant position identifier 224 and/or the display controller 202 causes data associated with the first participant to be displayed at the first side 906 via a first window or section and causes data associated with the second participant to be displayed at the second side 908 via a second window or section. Alternatively, when the participant identifier 218 and/or the participant position identifier 224 identifies a third participant on a third side 910 of the conical surface 902, in some examples, the participant position identifier 224 and/or the display controller 202 causes data associated with the first participant to be displayed at the first side 906, causes data associated with the second participant to be displayed at the second side 908 and causes data associated with the third participant to be displayed at the third side 910.

Figure 10:
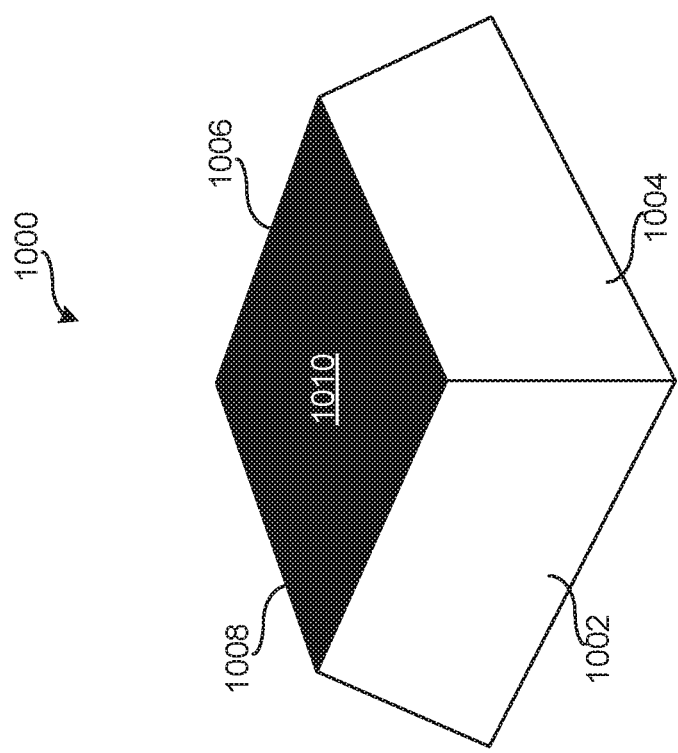
FIG. 10 illustrates an example table-top collaboration device having a square frustum shape that can be used to implement the example table-top collaboration device of FIG. 1.

The example collaboration device 1000 of FIG. 10 is a square frustum including a first side 1002, a second side 1004, a third side 1006, a fourth side 1008 and an end 1010. In some examples, the first, second, third and/or fourth sides 1002, 1004, 1006, 1008 are used to implement the example display 104 of FIG. 1. Thus, in some such examples, the first side 1002 is used to display data to the first participant, the second side 1004 is used to display data to the second participant, the third side 1006 is used to display data to the third participant and the fourth side 1008 is used to display data to the fourth participant. In some examples, the end 1010 implements the speaker 106 of FIG. 1.

Figure 11:
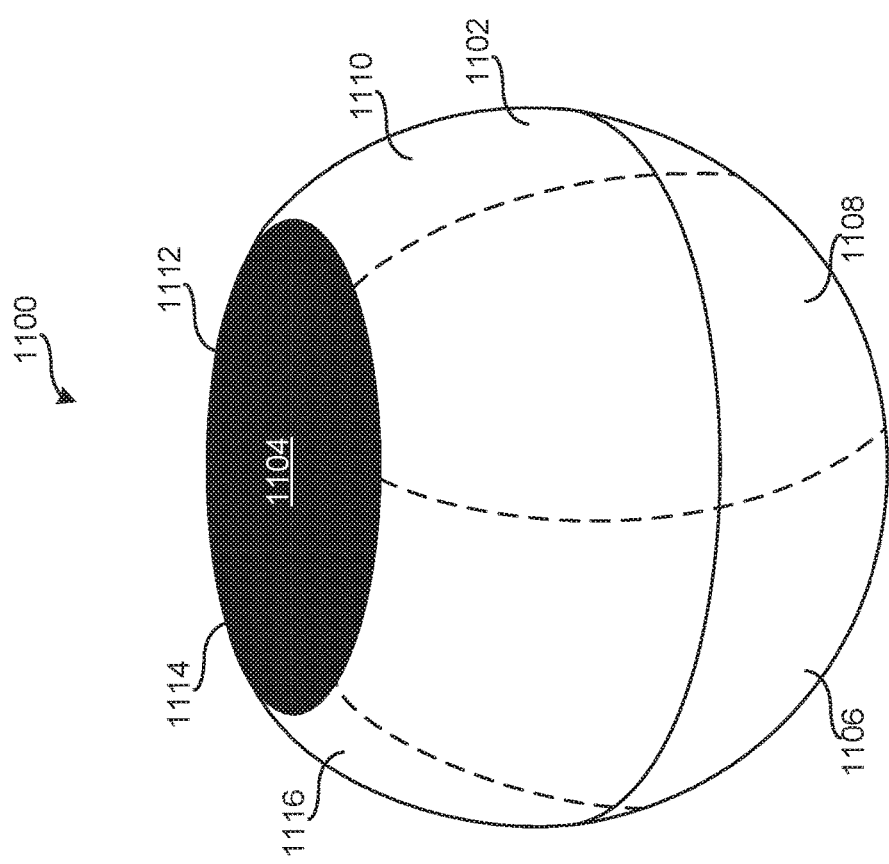
FIG. 11 illustrates an example table-top collaboration device having a spherical cap shape that can be used to implement the example table-top collaboration device of FIG. 1.
Figure 12:
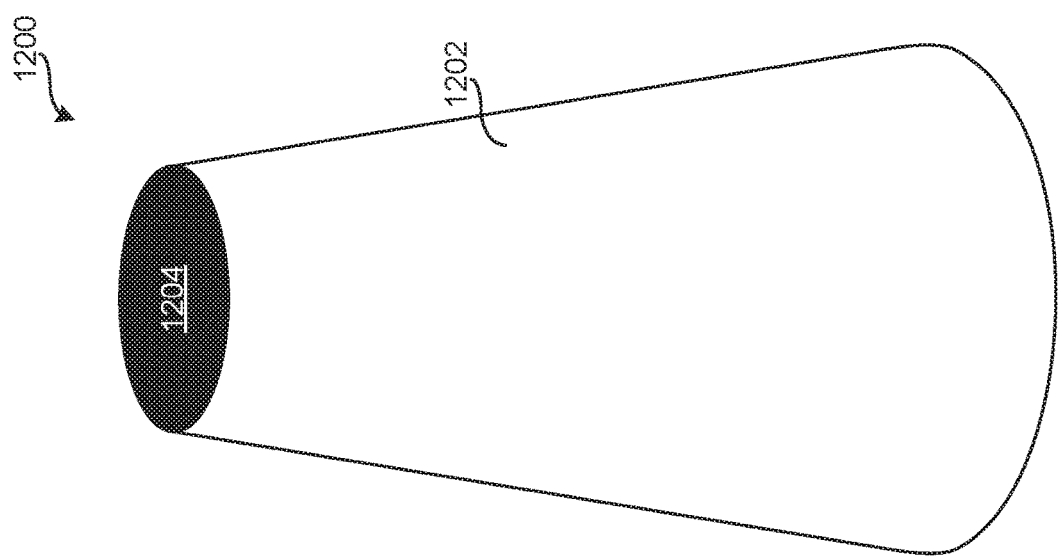
FIG. 12 illustrates another example table-top collaboration device having a conical frustum shape that can be used to implement the example table-top collaboration device of FIG. 1.

The example collaboration device 1100 of FIG. 11 is a spherical cap including a spherical surface 1102 and an end 1104. In some examples, the spherical surface 1102 implements the example display 104 of FIG. 1 and the end 1104 implements the speaker 106 of FIG. 1. In some examples in which the participant identifier 218 and/or the participant position identifier 224 identifies six individuals using the example collaboration device 1100, the participant position identifier 224 and/or the display controller 202 separates the spherical surface 1102 into first, second, third, fourth, fifth and sixth sub-displays 1106, 1108, 1110, 1112, 1114, 1116 such that data associated with the corresponding participants can be displayed via the corresponding sub-display 1106, 1108, 1110, 1112, 1114, 1116. In some examples when the participant identifier 218 and/or the participant position identifier 224 identifies three participants, the participant position identifier 218 and/or the display controller 202 may separate the spherical surface 1102 into three displays instead. In other words, the collaboration device 1100 can dynamically change the number and/or the size of the windows and/or sub displays provided to accommodate any number of participants. The example collaboration device 1200 of FIG. 12 is another conical frustum including a conical surface 1202 and an end 1204. In some examples, the conical surface 1202 implements the example display 104 of FIG. 1 and the end 1204 implements the speaker 106 of FIG. 1.

Figure 13:
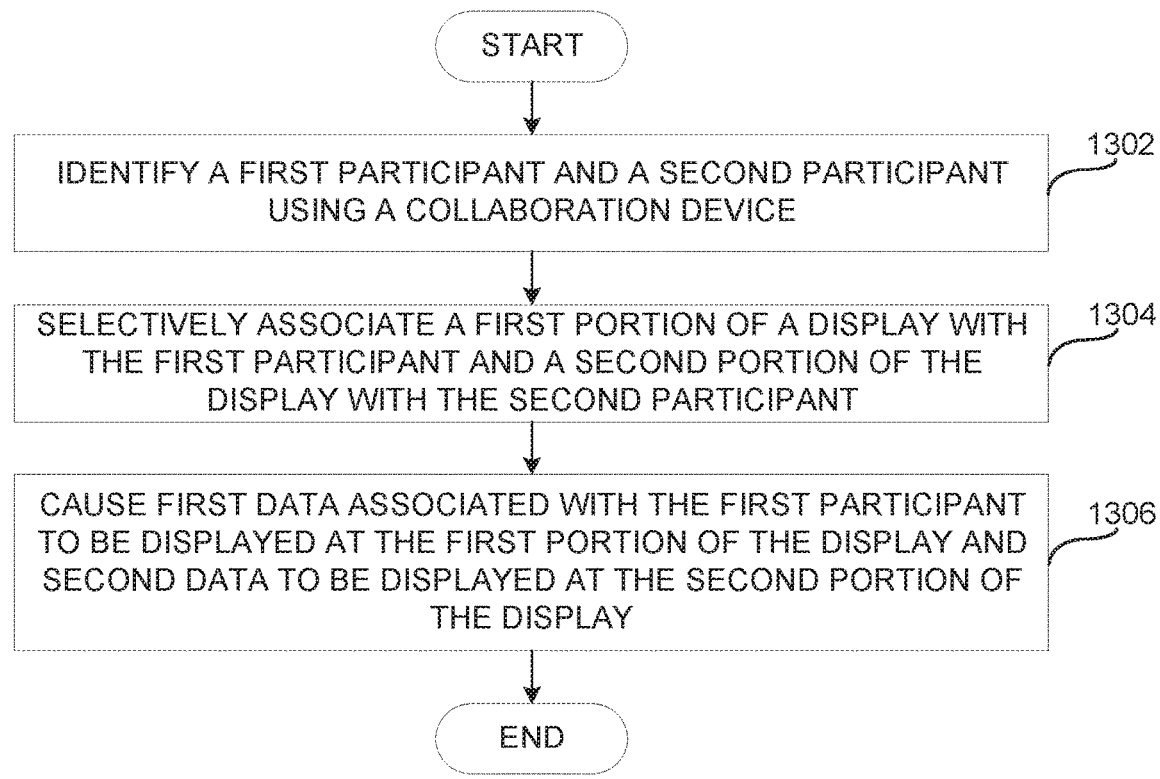
FIGS. 13 and 14 are flowcharts representative of machine readable instructions that may be executed to implement the example conferencer of FIG. 2.
Figure 14:
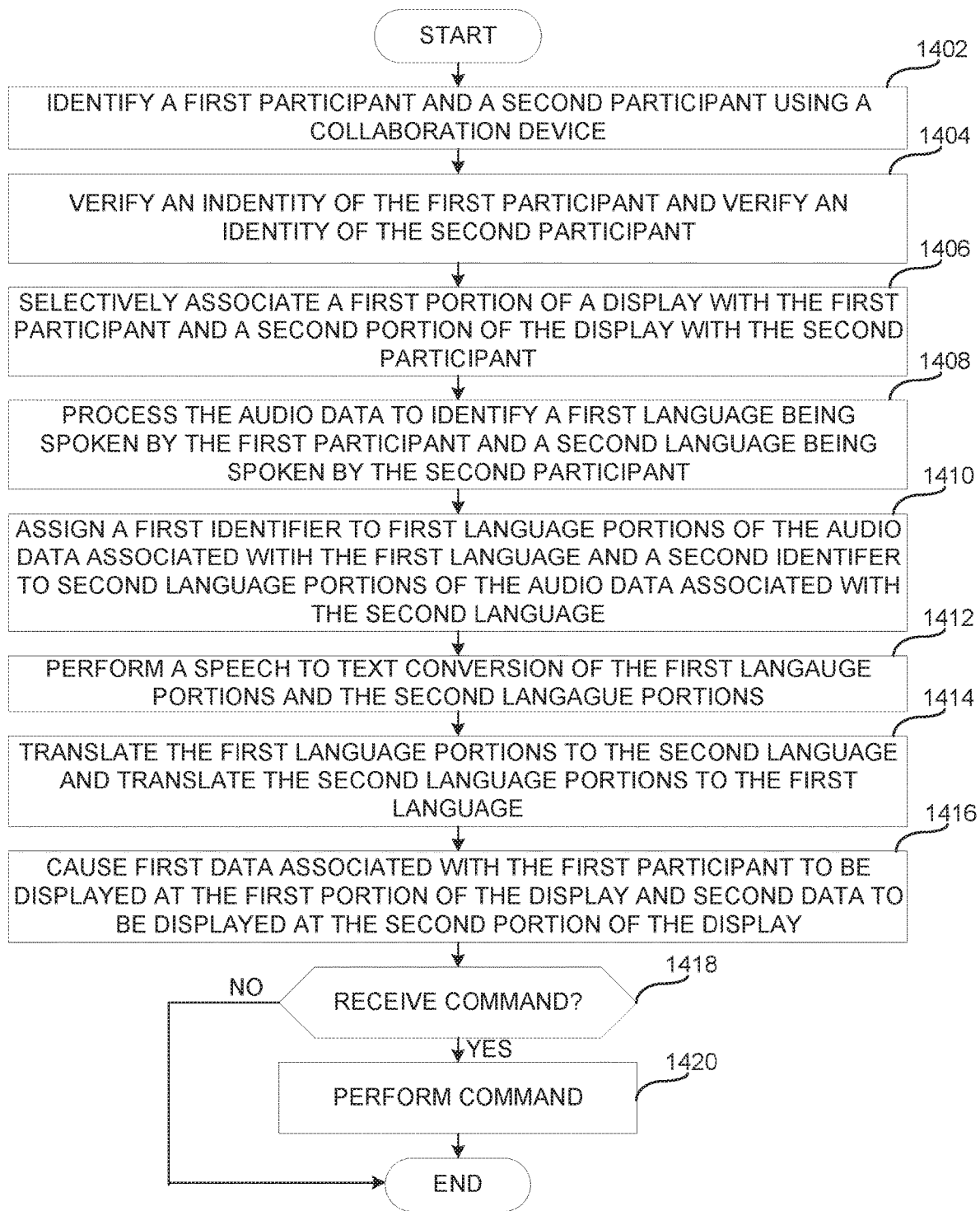

A flowchart representative of example machine readable instructions for implementing the conferencer 114 of FIG. 2 is shown in FIGS. 13 and 14. In this example, the machine readable instructions comprise a program for execution by a processor such as the processor 1512 shown in the example processor platform 1500 discussed below in connection with FIG. 15. The program may be embodied in software stored on a non-transitory computer readable storage medium such as a CD-ROM, a floppy disk, a hard drive, a digital versatile disk (DVD), a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIGS. 13 and 14, many other methods of implementing the example conferencer 114 may alternatively be used. For example, the order of execution of the blocks may be changed, and/or some of the blocks described may be changed, eliminated, or combined. Additionally or alternatively, any or all of the blocks may be implemented by hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 13 and 14 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

The program of FIG. 13 begins at block 1302 with the participant identifier 218 identifying a first participant and a second participant using the collaboration device 102. In some examples, the participant identifier 218 identifies the number of participants by processing audio data, image data and/or video data and/or by accessing an input from the participant(s) at the interface 116 of the collaboration device 102. In response to identifying the first and second participants using the collaboration device 102, the display controller 202 selectively associates a first portion of the display 104 with the first participant and a second portion of the display 104 with the second participant (block 1304). In some examples, the first portion of the display 104 corresponds to the first display 312 and the second portion of the display 104 corresponds to the second display 314, where the first and second displays 312, 314 are viewable from different sides of the collaboration device 300. The display controller 202 causes first data associated with the first participant to be displayed at the first portion of the display 104 and second data associated with the second participant to be displayed at the second portion of the display 104 (block 1306).

The program of FIG. 14 begins at block 1402 with the participant identifier 218 identifying a first participant and a second participant using the collaboration device 102. The authenticator 226 processes audio data and/or image data to verify an identity of the first participant and to verify an identity of the second participant (block 1404). In response to identifying the first and second participants using the collaboration device 102, the display controller 202 selectively associates a first portion of the display 104 with the first participant and a second portion of the display 104 with the second participant (block 1406).

The language identifier 212 processes the audio data to identify a first language being spoken by the first participant and a second language being spoken by the second participant (block 1408). In response to identifying the first and second languages being spoken, the language identifier 212 assigns a first identifier to first language portions of the audio data associated with the first language and assigns a second identifier to second language portions of the audio data associated with the second language (block 1410).

The speech to text converter 216 performs a speech to text conversion of the first language portions of the audio data and performs a speech to text conversion of the second language portions of the audio data (block 1412). The translator 214 translates the first language portions to the second language and translates the second language portions to the first language (block 1414). The display controller 202 causes first data associated with the first participant to be displayed at the first portion of the display 104 and second data associated with the second participant to be displayed at the second portion of the display 104 (block 1416). In some examples, the first portion of the display 104 corresponds to the first sub display 1106 and the second portion of the display 104 corresponds to the second sub display 1108, where the first and second sub displays 1106, 1108 are viewable from different sides of the collaboration device 1100.

At block 1418, the creator 222 determines whether a command has been received. In some examples, the command is a summary command received from the first participant or the second participant at the collaboration device 102. In some examples, the command is a flag for comment command received from one of the first participant or the second participant at the collaboration device 102. In examples in which a command has been received, the creator 222 performs the identified command (block 1420). For example, in response to receiving a summary command, the creator 222 parses the audio data and/or text data and generates a summary from the parsed data. In response to receiving a flag for comment command, in some examples, the creator 222 generating an icon and/or the flag 337 adjacent corresponding text associated with flagging the corresponding text for comment.

Figure 15:
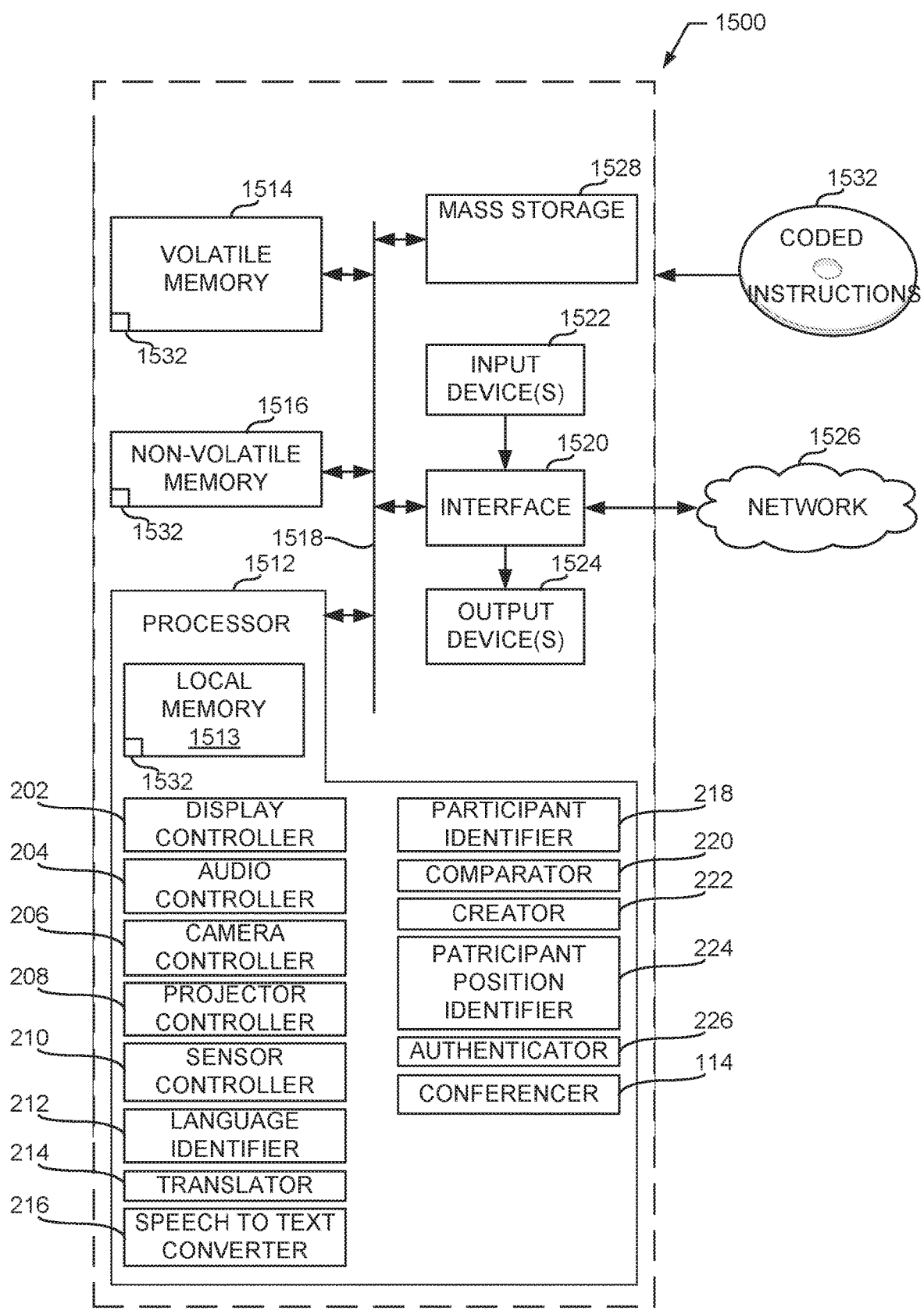
FIG. 15 is a processor platform to execute the instructions of FIGS. 13 and 14 to implement the conferencer of FIG. 2.

FIG. 15 is a block diagram of an example processor platform 1500 capable of executing the instructions of FIGS. 13 and 14 to implement the conferencer 114 of FIG. 2. The processor platform 1500 can be, for example, a server, a personal computer, a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by integrated circuits, logic circuits, microprocessors or controllers from any desired family or manufacturer. The hardware processor may be a semiconductor based (e.g., silicon based) device. In this example, the processor 1512 implements the example display controller 202, the example audio controller 204, the example camera controller 206, the example projector controller 208, the example sensor controller 210, the example language identifier 212, the example translator 214, the example speech to text converter 216, the example participant identifier 218, the example comparator 220, the example creator 222, the example participant position identifier 224, the example authenticator 226 and the example conferencer 114.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), and/or a PCI express interface.

In the illustrated example, input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system.

Output devices 1524 are also connected to the interface circuit 1520 of the illustrated example. The output devices 1524 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1520 of the illustrated example, thus, includes a graphics driver card, a graphics driver chip and/or a graphics driver processor.

The interface circuit 1520 of the illustrated example also includes a communication device such as a transmitter, a receiver, a transceiver, a modem and/or network interface card to facilitate exchange of data with external machines (e.g., computing devices of any kind) via a network 1526 (e.g., an Ethernet connection, a digital subscriber line (DSL), a telephone line, coaxial cable, a cellular telephone system, etc.).

The processor platform 1500 of the illustrated example also includes mass storage devices 1528 for storing software and/or data. Examples of such mass storage devices 1528 include floppy disk drives, hard drive disks, compact disk drives, Blu-ray disk drives, RAID systems, and digital versatile disk (DVD) drives.

The coded instructions 1532 of FIGS. 13 and 14 may be stored in the mass storage device 1528, in the volatile memory 1514, in the non-volatile memory 1516, and/or on a removable tangible computer readable storage medium such as a CD or DVD.

From the foregoing, it will be appreciated that example methods, apparatus and articles of manufacture have been disclosed relating to conferencing devices. In some examples, the collaboration devices include displays that are dynamically configurable to provide customized windows for each participant of the meeting and/or each group of participants of the meeting. For example, when one participant is using the collaboration device, the entire display may be used to display data to the one participant and when two participants are using the collaboration device, the display may be separated into a first sub display that provides data to the first participant and a second sub display that provides data to the second participant. In some examples, the example collaboration devices enable data to be accessible, sharable and/or displayable. In some examples, the example collaboration devices include displays to enable one participant to view data in a first language and to enable a second participant to view data in a second language.

An example table-top collaboration device includes a housing; a sensor to obtain audio data, image data, or video data; a display including a first portion and a second portion, the first portion viewable from a first side of the device and the second portion viewable from a second side of the device; and a processor to facilitate a collaboration session between participants, the processor to use the audio data, the image data, or the video data during the collaboration session.

In some examples, the housing has a triangular cross-section including a first surface and a second surface, the first surface carrying the first portion of the display, the second surface carrying the second portion of the display. In some examples, the housing includes an end that is structured to enable audio to be emitted from the housing. In some examples, the table-top collaboration device includes a speaker carried by the housing to emit the audio. In some examples, the sensor includes a camera carried by the housing, the camera to capture at least one of the image data or the video data.

An example tangible computer-readable medium comprising instructions that, when executed, cause a processor to, at least: identify a first participant and a second participant using a table-top collaboration device; in response to identifying the first and second participants using the table-top collaboration device, selectively associate a first portion of a display of the table-top collaboration device with the first participant and selectively associate a second portion of the display with the second participant, the first portion viewable from a first side of the table-top collaboration device and the second portion viewable from a second side of the table-top collaboration device; and cause first data associated with the first participant to be displayed at the first portion of the display and second data associated with the second participant to be displayed at the second portion of the display. In some examples, the instructions, when executed, further cause the processor to: process audio data to identify a first language being spoken by the first participant and a second language being spoken by the second participant; in response to identifying the first and second languages being spoken, assign a first identifier to first language portions of the audio data associated with the first language and a second identifier to second language portions of the audio data associated with the second language; translate the first language portions to the second language and translate the second language portions to the first language; and display the second language portions in the first language at the first portion of the display and display the first language portions in the second language at the second portion of the display.

An example method includes identifying, by executing an instruction with at least one processor, a first participant and a second participant using a table-top collaboration device; in response to identifying the first and second participants using the table-top collaboration device, selectively associating, by executing an instruction with at least one processor, a first portion of a display of the table-top collaboration device with the first participant and a second portion of the display with the second participant, the first portion viewable from a first side of the table-top collaboration device and the second portion viewable from a second side of the table-top collaboration device; and causing, by executing an instruction with at least one processor, first data associated with the first participant to be displayed at the first portion of the display and second data associated with the second participant to be displayed at the second portion of the display.

In some examples, the includes processing audio data to identify a first language being spoken by the first participant and a second language being spoken by the second participant, in response to identifying the first and second languages being spoken, assigning a first identifier to first language portions of the audio data associated with the first language and a second identifier to second language portions of the audio data associated with the second language. In some examples, the method includes translating the first language portions to the second language and translating the second language portions to the first language and enabling the second language portions to be receivable by the first participant in the first language and the first language portions to be receivable by the second participant in the second language.

In some examples, the enabling of the second language portions to be receivable by the first participant in the first language and the first language portions to be receivable by the second participant in the second language includes: performing a speech to text conversion of the first language portions of the audio data and the second language portions of the audio data and translating the first language portions to the second language and translating the second language portions to the first language; and displaying the second language portions in the first language at the first portion of the display and displaying the first language portions in the second language at the second portion of the display.

In some examples, the method includes processing audio data or image data to verify an identity of the first participant and to verify an identity of the second participant. In some examples, the audio data is obtained via a sensor of the table-top collaboration device and the image data is obtained via a camera of the table-top collaboration device. In some examples, the method includes accessing a summary command received from one of the first participant or the second participant at the table-top collaboration device, in response to accessing the summary command, parsing audio data or text data and generating a summary from the parsed data. In some examples, the method includes performing a speech to text conversion of audio data and displaying text via the first portion of the display, further including accessing a flag for comment command received from one of the first participant or the second participant at the table-top collaboration device, in response to accessing the flag for comment command, generating an icon adjacent corresponding text associated with flagging the corresponding text for comment.

An example table-top collaboration device including a housing; a sensor to obtain audio data, image data, or video data; a display including a first portion and a second portion, the first portion viewable from a first side of the device and not from a second side of the device and the second portion viewable from the second side of the device and not viewable from the first side of the device; and a processor to facilitate a collaboration session between participants, the processor to use the audio data, the image data, or the video data during the collaboration session.

An example table-top collaboration device includes a housing; a sensor to obtain audio data, image data, or video data; a display including a first portion and a second portion, the first and second portions forming two sides of a convex polygon or a convex surface, the first portion viewable from a first side of the device and the second portion viewable from a second side of the device; and a processor to facilitate a collaboration session between participants, the processor to use the audio data, the image data, or the video data during the collaboration session.

An example table-top collaboration device includes a housing; a sensor to obtain audio data, image data, or video data; a display including a first portion and a second portion, the first and second portions forming two sides of a convex polygon, the first portion viewable from a first side of the device and the second portion viewable from a second side of the device; and a processor to facilitate a collaboration session between participants, the processor to use the audio data, the image data, or the video data during the collaboration session.

An example table-top collaboration device including a housing including a base, a first side, and a second side, the base extending between the first side and the second side, the base structured to rest on a surface during a collaboration session, the first side facing a different direction than the second side, the first side positioned to be viewable when the base rests on the surface, the second side positioned to be viewable when the base rests on the surface; a sensor to obtain audio data, image data, or video data; a first display and a second display, the first display carried by the first side of the housing, the first display being viewable when the base rests on the surface, the second display carried by the second side of the housing, the second display being viewable when the base rests on the surface; and a processor to facilitate the collaboration session, the processor to use the audio data, the image data, or the video data during the collaboration session.

Example 1

An example table-top collaboration device, includes a housing including a base, an end, a first side, and a second side, the end opposite the base and being smaller than the base, the base extending between the first side and the second side, the base structured to rest on a surface during a collaboration session, the first side facing a different direction than the second side, the first side positioned to be viewable when the base rests on the surface, the second side positioned to be viewable when the base rests on the surface; a sensor to obtain audio data, image data, or video data; a first display and a second display, the first display carried by the first side of the housing, the first display being viewable when the base rests on the surface, the second display carried by the second side of the housing, the second display being viewable when the base rests on the surface; and a processor to facilitate the collaboration session, the processor to use the audio data, the image data, or the video data during the collaboration session.

Example 2

In Example 1 or other examples, the housing has a triangular cross-section including the first side and the second end.

Example 3

In Examples 1 or 2 or other examples, the housing includes a second end that is structured to enable audio to be emitted from the housing.

Example 4

In Example 3 or other examples, the table-top collaboration includes a speaker carried by the housing to emit the audio.

Example 5

In Examples 3 or 4 or other examples, the sensor includes a camera carried by the housing, the camera to capture at least one of the image data or the video data.

Example 6

An example tangible computer-readable medium comprising instructions that, when executed, cause a processor to, at least: identify a first participant and a second participant using a table-top collaboration device; in response to identifying the first and second participants using the table-top collaboration device, selectively associate a first portion of a display of the table-top collaboration device with the first participant and selectively associate a second portion of the display with the second participant, the first and second portions forming a convex surface or two sides of a convex polygon; and cause first data associated with the first participant to be displayed at the first portion of the display and second data associated with the second participant to be displayed at the second portion of the display.

Example 7

In Example 6 or other examples, the instructions, when executed, further cause the processor to: process audio data to identify a first language being spoken by the first participant and a second language being spoken by the second participant; in response to identifying the first and second languages being spoken, assign a first identifier to first language portions of the audio data associated with the first language and a second identifier to second language portions of the audio data associated with the second language; translate the first language portions to the second language and translate the second language portions to the first language; and display the second language portions in the first language at the first portion of the display and display the first language portions in the second language at the second portion of the display.

Example 8

An example method, includes identifying, by executing an instruction with at least one processor, a first participant and a second participant using a table-top collaboration device; in response to identifying the first and second participants using the table-top collaboration device, selectively associating, by executing an instruction with at least one processor, a first portion of a display of the table-top collaboration device with the first participant and a second portion of the display with the second participant, the first and second portions forming a convex surface or two sides of a convex polygon; and causing, by executing an instruction with at least one processor, first data associated with the first participant to be displayed at the first portion of the display and second data associated with the second participant to be displayed at the second portion of the display.

Example 9

In Example 8 or other examples, the method includes processing audio data to identify a first language being spoken by the first participant and a second language being spoken by the second participant, in response to identifying the first and second languages being spoken, assigning a first identifier to first language portions of the audio data associated with the first language and a second identifier to second language portions of the audio data associated with the second language.

Example 10

In Example 9 or other examples, the method includes translating the first language portions to the second language and translating the second language portions to the first language and enabling the second language portions to be receivable by the first participant in the first language and the first language portions to be receivable by the second participant in the second language.

Example 11

In Example 10 or other examples, the enabling of the second language portions to be receivable by the first participant in the first language and the first language portions to be receivable by the second participant in the second language includes: performing a speech to text conversion of the first language portions of the audio data and the second language portions of the audio data and translating the first language portions to the second language and translating the second language portions to the first language; and displaying the second language portions in the first language at the first portion of the display and displaying the first language portions in the second language at the second portion of the display.

Example 12

In Examples 8, 9, 10, 11 or other examples, the method includes processing audio data or image data to verify an identity of the first participant and to verify an identity of the second participant.

Example 13

In Example 12 or other examples, the audio data is obtained via a sensor of the table-top collaboration device and the image data is obtained via a camera of the table-top collaboration device.

Example 14

In Examples 8, 9, 10, 11, 12, 13 or other examples, the method includes accessing a summary command received from one of the first participant or the second participant at the table-top collaboration device, in response to accessing the summary command, parsing audio data or text data and generating a summary from the parsed data.

Example 15

In Examples 8, 9, 10, 11, 12, 13, 14 or other examples, the includes performing a speech to text conversion of audio data and displaying text via the first portion of the display, further including accessing a flag for comment command received from one of the first participant or the second participant at the table-top collaboration device, in response to accessing the flag for comment command, generating an icon adjacent corresponding text associated with flagging the corresponding text for comment.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:
1. A table-top collaboration device, comprising:
a housing including a base, an end, a first side, and a second side, the end opposite the base and being smaller than the base, the base extending between the first side and the second side, the base structured to rest on a surface during a collaboration session, the first side facing a different direction than the second side, the first side positioned to be viewable when the base rests on the surface, the second side positioned to be viewable when the base rests on the surface;
a sensor to obtain audio data, image data, or video data;
a first display and a second display, the first display carried by the first side of the housing, the first display being viewable when the base rests on the surface, the second display carried by the second side of the housing, the second display being viewable when the base rests on the surface; and a processor to facilitate the collaboration session, the processor to:
use the audio data, the image data, or the video data during the collaboration session;
access a flag for comment command received from a participant of the collaboration session; and
in response to accessing the flag for comment command, generating an icon adjacent corresponding text associated with flagging the corresponding text for comment.

2. The table-top collaboration device of claim 1, wherein the housing has a triangular cross-section including the first side and the second end.

3. The table-top collaboration device of claim 1, wherein the housing includes a second end that is structured to enable audio to be emitted from the housing.

4. The table-top collaboration device of claim 3, further including a speaker carried by the housing to emit the audio.

5. The table-top collaboration device of claim 3, wherein the sensor includes a camera carried by the housing, the camera to capture at least one of the image data or the video data.

6. A tangible computer-readable medium comprising instructions that, when executed, cause a processor to, at least:
identify a first participant and a second participant using a table-top collaboration device;
in response to identifying the first and second participants using the table-top collaboration device, selectively associate a first portion of a display of the table-top collaboration device with the first participant and selectively associate a second portion of the display with the second participant, the first and second portions forming a convex surface or two sides of a convex polygon;
cause first data associated with the first participant to be displayed at the first portion of the display and second data associated with the second participant to be displayed at the second portion of the display; and
access a flag for comment command received from the first participant or the second participant at the table-top collaboration device, and
in response to accessing the flag for comment command, generating an icon adjacent corresponding text associated with flagging the corresponding text for comment.

7. The computer-readable medium as defined in claim 6, wherein the instructions, when executed, further cause the processor to:
process audio data to identify a first language being spoken by the first participant and a second language being spoken by the second participant;
in response to identifying the first and second languages being spoken, assign a first identifier to first language portions of the audio data associated with the first language and a second identifier to second language portions of the audio data associated with the second language;
translate the first language portions to the second language and translate the second language portions to the first language; and
display the second language portions in the first language at the first portion of the display and display the first language portions in the second language at the second portion of the display.

8. A method comprising:
identifying, by executing an instruction with at least one processor, a first participant and a second participant using a table-top collaboration device;
in response to identifying the first and second participants using the table-top collaboration device, selectively associating, by executing an instruction with at least one processor, a first portion of a display of the table-top collaboration device with the first participant and a second portion of the display with the second participant, the first and second portions forming a convex surface or two sides of a convex polygon;
causing, by executing an instruction with at least one processor, first data associated with the first participant to be displayed at the first portion of the display and second data associated with the second participant to be displayed at the second portion of the display;
performing a speech to text conversion of audio data and displaying text via the first portion of the display,
accessing a flag for comment command received from one of the first participant or the second participant at the table-top collaboration device;
in response to accessing the flag for comment command, generating an icon adjacent corresponding text associated with flagging the corresponding text for comment.

9. The method of claim 8, further including processing audio data to identify a first language being spoken by the first participant and a second language being spoken by the second participant, in response to identifying the first and second languages being spoken, assigning a first identifier to first language portions of the audio data associated with the first language and a second identifier to second language portions of the audio data associated with the second language.

10. The method of claim 9, further including translating the first language portions to the second language and translating the second language portions to the first language and enabling the second language portions to be receivable by the first participant in the first language and the first language portions to be receivable by the second participant in the second language.

11. The method of claim 10, wherein the enabling of the second language portions to be receivable by the first participant in the first language and the first language portions to be receivable by the second participant in the second language includes:
performing a speech to text conversion of the first language portions of the audio data and the second language portions of the audio data and translating the first language portions to the second language and translating the second language portions to the first language; and
displaying the second language portions in the first language at the first portion of the display and displaying the first language portions in the second language at the second portion of the display.

12. The method of claim 8, further including processing audio data or image data to verify an identity of the first participant and to verify an identity of the second participant.

13. The method of claim 12, wherein the audio data is obtained via a sensor of the table-top collaboration device and the image data is obtained via a camera of the table-top collaboration device.

14. The method of claim 8, further including accessing a summary command received from one of the first participant or the second participant at the table-top collaboration device, in response to accessing the summary command, parsing audio data or text data and generating a summary from the parsed data.

15. The method of claim 8 wherein the displayed text that is flagged for comment is a result of performing the speech to text conversion of audio data.

* * * * *